US012799014B2

(12) United States Patent
Tenyama

(10) Patent No.: US 12,799,014 B2
(45) Date of Patent: Nov. 17, 2026

(54) APPARATUS AND METHOD FOR PRODUCING GLASS ARTICLE

(71) Applicant: Nippon Electric Glass Co., Ltd., Shiga (JP)

(72) Inventor: Kazuyuki Tenyama, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 526 days.

(21) Appl. No.: 17/766,290

(22) PCT Filed: Jul. 16, 2020

(86) PCT No.: PCT/JP2020/027681

§ 371 (c)(1),
(2) Date: Apr. 4, 2022

(87) PCT Pub. No.: WO2021/075110

PCT Pub. Date: Apr. 22, 2021

(65) Prior Publication Data

US 2024/0010540 A1 Jan. 11, 2024

(30) Foreign Application Priority Data

Oct. 18, 2019 (JP) ................................ 2019-191177

(51) Int. Cl.
*C03B 5/42* (2006.01)
*C03B 5/187* (2006.01)

(52) U.S. Cl.
CPC ................ *C03B 5/42* (2013.01); *C03B 5/187* (2013.01)

(58) Field of Classification Search
None
See application file for complete search history.

(56) References Cited

U.S. PATENT DOCUMENTS

| | | | | |
|---|---|---|---|---|
| 5,727,939 | A * | 3/1998 | Snyder | F27D 99/0073 432/205 |
| 2020/0299171 | A1 | 9/2020 | Tenyama et al. | |

FOREIGN PATENT DOCUMENTS

| | | |
|---|---|---|
| JP | 5510446 | 6/2014 |
| JP | 2015-124107 | 7/2015 |
| WO | 2013/150912 | 10/2013 |
| WO | 2014/013885 | 1/2014 |

(Continued)

OTHER PUBLICATIONS

WO 2014013885 machine translation; Ueta, Eisaku et al.; Glass Plate Manufacturing Device, Jan. 2014 (Year: 2014).*

(Continued)

*Primary Examiner* — Queenie S Dehghan
(74) *Attorney, Agent, or Firm* — Wenderoth, Lind & Ponack, L.L.P.

(57) ABSTRACT

Provided is an apparatus (1) for manufacturing a glass article, including: a glass melting furnace (2) configured to produce molten glass; a treatment device (6) configured to perform a predetermined treatment on the produced molten glass; and a forming device (5) configured to form the molten glass into a predetermined shape that has been subjected to the predetermined treatment. The treatment device (6) includes: a treatment tank (13, 15) to be supplied with the molten glass; and a casing (12) configured to hold the treatment tank (13, 15). The casing (12) is supported in a suspended manner.

4 Claims, 7 Drawing Sheets

(56) References Cited

FOREIGN PATENT DOCUMENTS

| | | |
|---|---|---|
| WO | 2015/137163 | 9/2015 |
| WO | 2019/124018 | 6/2019 |

OTHER PUBLICATIONS

SE 454587 machine translation, Fransson Arne, Device for Handling and Storage of Molten Glass, May 1988 (Year: 1988).*

International Preliminary Report on Patentability and Written Opinion of the International Searching Authority issued Apr. 19, 2022 in International (PCT) Application No. PCT/JP2020/027681.

International Search Report issued Oct. 13, 2020 in International (PCT) Application No. PCT/JP2020/027681.

* cited by examiner

APPARATUS AND METHOD FOR PRODUCING GLASS ARTICLE

TECHNICAL FIELD

The present invention relates to an apparatus for manufacturing a glass article and a method of manufacturing a glass article, and more particularly, to a technology for performing a predetermined treatment such as homogenization on molten glass during (in a middle of) a process from a molten glass producing step to a forming step.

BACKGROUND ART

As is commonly known, when molten glass is conveyed from a melting furnace to a forming device, the molten glass supplied to the forming device is stirred in a stirring device provided on a conveyance path. The stirring device has such a configuration that a stirrer having stirring blades provided thereto is disposed in a stirring tank having a cylindrical shape. After the molten glass is caused to flow into the stirring tank, the stirrer is rotated about a predetermined shaft to give flow in a circumferential direction to the molten glass that has flowed into the stirring tank, allowing the molten glass to be stirred.

Meanwhile, when this kind of stirring device is used to homogenize the molten glass, not only part of the molten glass flowing in the vicinity of a center of the stirring tank (vicinity of center of rotation of the stirrer) but also part of the molten glass flowing in a radially outer part (along an inner wall) of the stirring tank are required to be sufficiently stirred. The part of molten glass flowing in the vicinity of the center of the stirring tank can relatively easily be stirred by the stirrer. However, the part of molten glass flowing along the inner wall passes and flows through a gap, which is inevitably defined between the stirring blades of the stirrer and the inner wall. Thus, various kinds of measures for effectively stirring the molten glass flowing along the inner wall have been proposed.

For example, in Patent Literature 1, it is described that a gap between radially outermost portions of the stirring blades and the inner wall of the stirring tank is set to be small, specifically, a turning diameter of each of the stirring blades is set to about 91% of an inner diameter dimension of the inner wall, to thereby reduce the amount of molten glass that flows to a downstream side without being brought into contact with the stirring blades.

Further, in Patent Literature 2, it is proposed that an outer diameter dimension of the stirrer is set to 0.85 times or more, preferably, 0.9 times or more of an inner diameter dimension of the stirring tank to prevent passage of the molten glass in the vicinity of an inner wall surface of a conveyance tube (stirring tank) for the molten glass.

CITATION LIST

Patent Literature

[PTL 1] JP 2015-124107 A
[PTL 2] JP 5510446 B1

SUMMARY OF INVENTION

Technical Problem

As described above, the stirring device of the related art is intended to improve stirring efficiency and, in turn, improve homogenization by controlling a radial gap between the stirrer (stirring blades) and the stirring tank. Incidentally, supposing use under a high-temperature environment, the stirring device generally has a structure in which a periphery of the stirring tank is covered with a refractory and in which the stirring tank and the refractory are accommodated in a casing. When the stirring device has the structure described above, however, the casing is sometimes deformed due to various factors such as an increase in size of the casing when the stirring device is installed or in use. At the time of installation or use, the casing is mounted onto a floor surface. Meanwhile, the stirrer and a device (motor) that rotationally drives the stirrer are mounted to a predetermined member at a position above and away from the floor surface. Thus, when the casing is deformed as described above, the stirring tank in a state of being held in the casing is inclined along with the deformation of the casing. Meanwhile, the stirrer in a state of being mounted at the position above and away from the floor surface maintains a posture taken before the casing is deformed. As a result, there is a higher risk in that a gap between a radially outermost portion of the stirrer (radially outermost portions of the stirring blades) and the inner surface of the stirring tank may greatly vary. Thus, it is difficult to stably perform a satisfactory stirring treatment, and in turn, a homogenization treatment with excellent quality.

The above-mentioned problem may occur not only in the stirring treatment (homogenization treatment) but also in another step of performing a predetermined treatment on the molten glass inside a treatment tank, for example, a flow rate adjustment step.

In view of the circumstances described above, a technical object of this specification is to provide an apparatus for manufacturing a glass article and a method of manufacturing a glass article, which prevent inclination of a treatment tank as much as possible and enable a satisfactory treatment to be stably performed on molten glass.

Solution to Problem

The above-mentioned object is achieved with an apparatus for manufacturing a glass article according to one aspect of the present invention. That is, there is provided an apparatus for manufacturing a glass article, comprising: a glass melting furnace configured to produce molten glass; a treatment device configured to perform a predetermined treatment on the produced molten glass; and a forming device configured to form the molten glass into a predetermined shape that has been subjected to the predetermined treatment, wherein the treatment device comprises: a treatment tank to be supplied with the molten glass; and a casing configured to hold the treatment tank, and wherein the casing is supported in a suspended manner.

As described above, in the apparatus for manufacturing a glass article according to one aspect of the present invention, when the treatment device comprises the casing configured to hold the treatment tank for the molten glass, the casing is supported in a suspended manner. When the casing of the treatment device is supported in a suspended manner as described above, a force of restoring an original shape of the casing (shape of the casing given before assembly) acts on the casing under its own weight. Thus, even if the casing is deformed at a time of installation work or when the treatment device is in use, the force of restoring the shape given before the deformation acts on the casing, allowing the shape of the casing to return to or become closer to the shape given before the deformation. Further, when the casing has the same shape as that given before assembly at the beginning of the support in a suspended manner, this shape is maintained under the own weight. As described above, according to the manufacturing apparatus according to one aspect of the present invention, inclination of the treatment tank, which may be caused at the time of installation of the treatment device or when the treatment device is in use, is prevented as much as possible, enabling prevention of a reduction in treatment efficiency or treatment ability, which may be caused due to the inclination. In other words, a satisfactory treatment can be stably performed on the molten glass.

Further, in the apparatus for manufacturing a glass article according to one aspect of the present invention, the casing may have a rectangular shape in plan view, and the casing may have a vertical cross section with a shape symmetric with respect to a vertical line passing through a center in a transverse direction of the vertical cross section. The "transverse direction" as used herein means, when the casing has a rectangular shape in plan view, a direction extending along sides being short sides of the casing. Similarly, a "longitudinal direction" as used herein means a direction extending along other sides being long sides of the casing.

When the shape of the casing is set as described above, a center of gravity of the casing can be set on the vertical line passing through the center in the transverse direction of the casing in design. Thus, when the casing has a designed shape at the beginning of the installation (support in a suspended manner), this state is maintained even when the treatment device is in use. When a center line of the casing, which passes through the center in the transverse direction on the vertical cross section of the casing, is inclined with respect to the vertical line at the time of installation, the own weight acts on the casing in such a direction as to match the center line with the vertical line. Thus, the casing always maintains the designed shape regardless of a state at the time of installation, enabling more reliable prevention of the inclination of the treatment tank.

Further, in the apparatus for manufacturing a glass article according to one aspect of the present invention, the casing may comprise a bottom portion and a pair of side wall portions being upright with respect to the bottom portion, and an inner surface of each of the side wall portions may have a perpendicularity equal to or smaller than 0.001 with respect to an upper surface of the bottom portion. The "perpendicularity" as used herein means, when a height dimension of each of the side wall portions is represented by 1, a distance between two ideal planes between which the inner surface of the side wall portion can be located. The perpendicularity is expressed in a dimensionless unit. Further, the "ideal plane" herein means an imaginary plane perpendicular to the upper surface of the bottom portion. When the perpendicularity is defined as described above, the perpendicularity of, for example, 0.001 means that, when the height dimension of each of the side wall portions is represented by 1, the inner surface of the side wall portion is located between the two ideal planes being apart from each other by 0.001. As a matter of course, when a parallelism between the inner surface and an outer surface of each of the side wall portions is extremely high, the "inner surface" of the side wall portion may be replaced by the "outer surface" of the side wall portion in the above-mentioned definition of the perpendicularity. Similarly, when a parallelism between the upper surface and a bottom surface (lower surface) of the bottom portion is extremely high, the "upper surface" of the bottom portion may be replaced by the "bottom surface (lower surface)" of the bottom portion in the above-mentioned definition of the perpendicularity.

As described above, when the casing has the bottom portion and one pair of side wall portions being upright with respect to the bottom portion, for example, the casing has a cuboidal shape, a sufficient shape restoring effect or shape maintaining effect achieved by support in a suspended manner can be enjoyed by determining the perpendicularity of the inner surface of each of the side wall portions with respect to the upper surface of the bottom portion as described above.

Further, as described above, the apparatus for manufacturing a glass article according to one aspect of the present invention prevents inclination of the treatment tank as much as possible so that a satisfactory treatment can be stably performed on the molten glass. Thus, it is preferred that the present invention be applied when, for example, the treatment tank is a stirring tank, a stirrer is accommodated in the stirring tank, and the molten glass supplied to the stirring tank is stirred through rotation of the stirrer, specifically, a treatment device is a stirring device.

Further, the object can also be achieved with a method of manufacturing a glass article according to one aspect of the present invention. That is, there is provided a method of manufacturing a glass article, comprising: a molten glass producing step of producing molten glass; a treatment step of performing a predetermined treatment on the produced molten glass; and a forming step of forming the molten glass into a predetermined shape that has been subjected to the predetermined treatment, wherein the treatment step comprises: a preparation step of preparing a treatment device comprising a treatment tank to be supplied with the molten glass and a casing configured to hold the treatment tank; and a treatment performing step of performing the predetermined treatment on the molten glass with use of the prepared treatment device, and wherein, in the preparation step, the casing configured to hold the treatment tank is supported in a suspended manner.

As described above, in the method of manufacturing a glass article according to one aspect of the present invention, when the treatment device comprises the casing configured to hold the treatment tank for the molten glass, in the preparation step for the treatment device, the casing is supported in a suspended manner. When the casing of the treatment device is supported as described above, a force of restoring a shape of the casing given before assembly acts on the casing under its own weight. Thus, even if the casing is deformed when the treatment device is installed or in use, the force of restoring the shape of the casing given before assembly acts on the casing, allowing the shape of the casing to return to or become closer to the shape given before deformation. Further, when the casing has the same shape as that given before assembly at the beginning of the support in a suspended manner, this shape is maintained under the own weight. As described above, according to the method of manufacturing a glass article according to one aspect of the present invention, inclination of the treatment tank, which may be caused when the treatment device is in use, is prevented as much as possible. As a result, a satisfactory treatment can be stably performed on the molten glass.

Further, in the method of manufacturing a glass article according to one aspect of the present invention, the casing may comprise a bottom portion and a pair of side wall portions being upright with respect to the bottom portion, and, in the preparation step, a perpendicularity of an inner surface of each of the side wall portions with respect to the upper surface of the bottom portion of the casing may be adjusted before the casing is supported in a suspended manner.

As described above, when the perpendicularity of each of the inner surfaces of the side wall portions with respect to the upper surface of the bottom portion of the casing is adjusted before the casing is supported in a suspended manner, the perpendicularity can be adjusted before the casing is subjected to assembly. Without the treatment tank or the refractory, the perpendicularity can be measured on an inner side of the casing under a state in which, for example, an outer side of the casing is held by a predetermined jig. Thus, the measurement of the perpendicularity and correction of the casing can easily be carried out repeatedly. Thus, the perpendicularity can extremely easily be adjusted.

Advantageous Effects of Invention

As described above, according to the present invention, it is possible to prevent inclination of the treatment tank as much as possible and enable a satisfactory treatment to be stably performed on the molten glass.

DESCRIPTION OF EMBODIMENT

Now, one embodiment of the present invention is described with reference to FIG. 1 to FIG. 8. First, an outline of an apparatus for manufacturing a glass article according to the present invention is described. Then, details of a homogenizer 6, which constitutes a main part of the present invention, are described.

Figure 1:
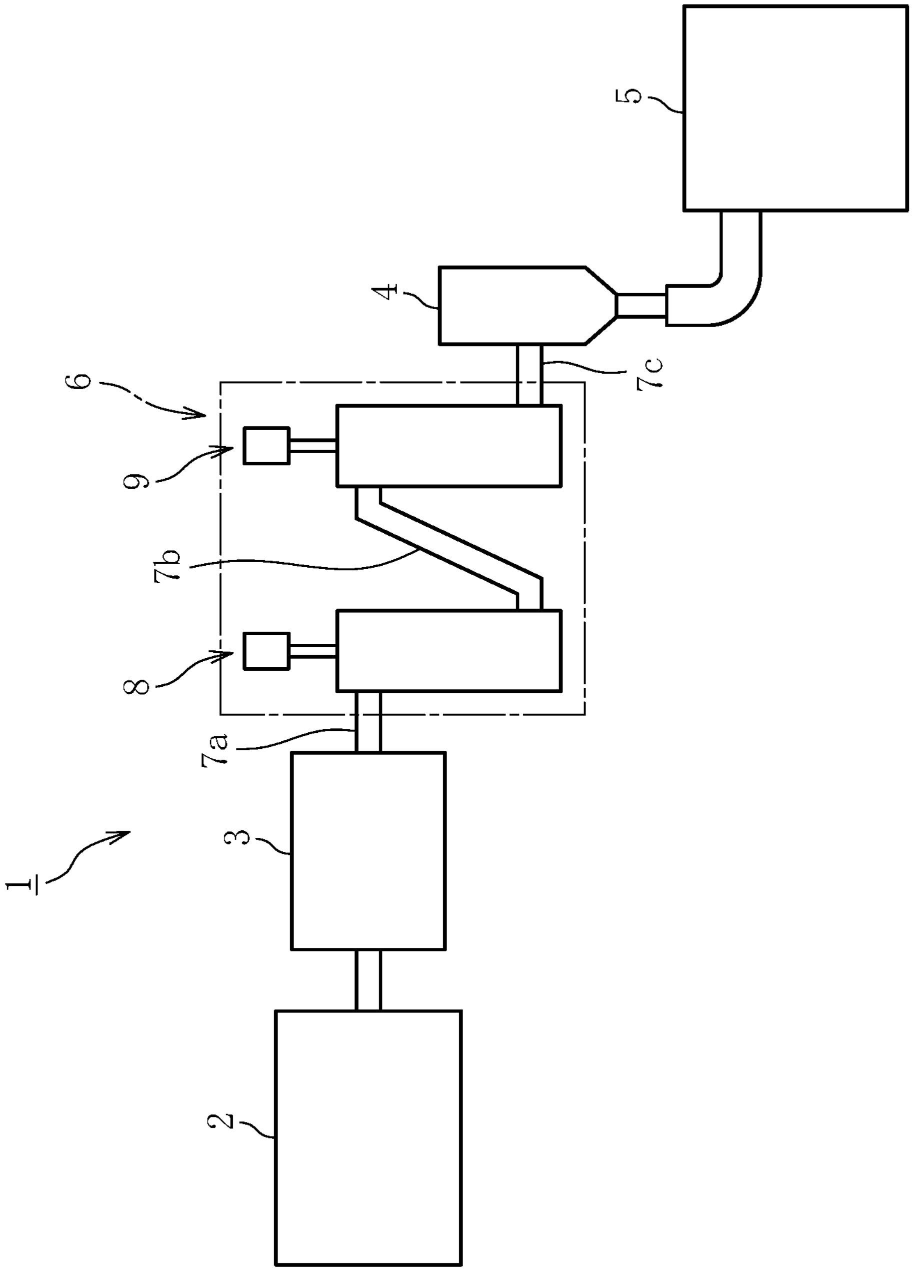
FIG. 1 is a side view for illustrating an overall configuration of an apparatus for manufacturing a glass article according to one embodiment of the present invention.

As illustrated in FIG. 1, an apparatus 1 for manufacturing a glass article according to this embodiment comprises a glass melting furnace 2, a fining device 3, a viscosity adjusting device 4, a forming device 5, and a homogenizer 6. The glass melting furnace 2 functions as a molten glass producing device arranged in a most upstream region. The fining device 3 is disposed on a downstream side of the glass melting furnace 2. The viscosity adjusting device 4 is disposed on a downstream side of the fining device 3, and is configured to mainly adjust a viscosity of molten glass. The forming device 5 is disposed on a downstream side of the viscosity adjusting device 4, and is configured to form the molten glass into a predetermined shape (for example, a glass sheet in this case). The homogenizer 6 is disposed in a conveyance flow path for the molten glass, which extends from the glass melting furnace 2 to the forming device 5. The homogenizer 6 in this embodiment corresponds to a treatment device according to the present invention.

The homogenizer 6 is a device configured to stir and mix the molten glass that has flowed out from the fining device 3 to achieve homogenization. The homogenizer 6 comprises a first stirring device 8 and a second stirring device 9. The first stirring device 8 is connected to the fining device 3 via a first supply pipe 7*a*. The second stirring device 9 is connected to the first stirring device 8 via a second supply pipe 7*b*. The second stirring device 9 is connected to the viscosity adjusting device 4 via a third supply pipe 7*c*.

The forming device 5 is configured to continuously form a glass ribbon of the molten glass, which serves as a base for glass sheets. For example, a forming device using a float method, a forming device using a roll-out method, a forming device using an overflow down-draw method, or a forming device using a slot down-draw method is used. The forming device 5 may form a glass article other than a glass sheet. As an example, the forming device 5 may continuously form glass tubes or glass rods of the molten glass by a Danner method.

When a glass sheet is manufactured as a glass article with use of the apparatus 1 for manufacturing a glass article, which has the configuration described above, a procedure illustrated in FIG. 5 is followed. First, a glass raw material is loaded into the glass melting furnace 2 to produce molten glass (molten glass producing step S1). Subsequently, after the thus produced molten glass is subjected to fining in the fining device 3 (fining step S2), a predetermined homogenization treatment is performed on the molten glass by the homogenizer 6 (homogenization step S3). After that, a viscosity of the molten glass that has been subjected to the predetermined homogenization treatment is adjusted by the viscosity adjusting device 4 (viscosity adjustment step S4). The molten glass having the adjusted viscosity is supplied to the forming device 5, and then continuously forms glass sheets of the molten glass (forming step S5). In this manner, glass sheets are continuously manufactured. The homogenization step S3 in this embodiment corresponds to a treatment step according to the present invention.

Next, details of the homogenizer 6 are described.

Figure 2:
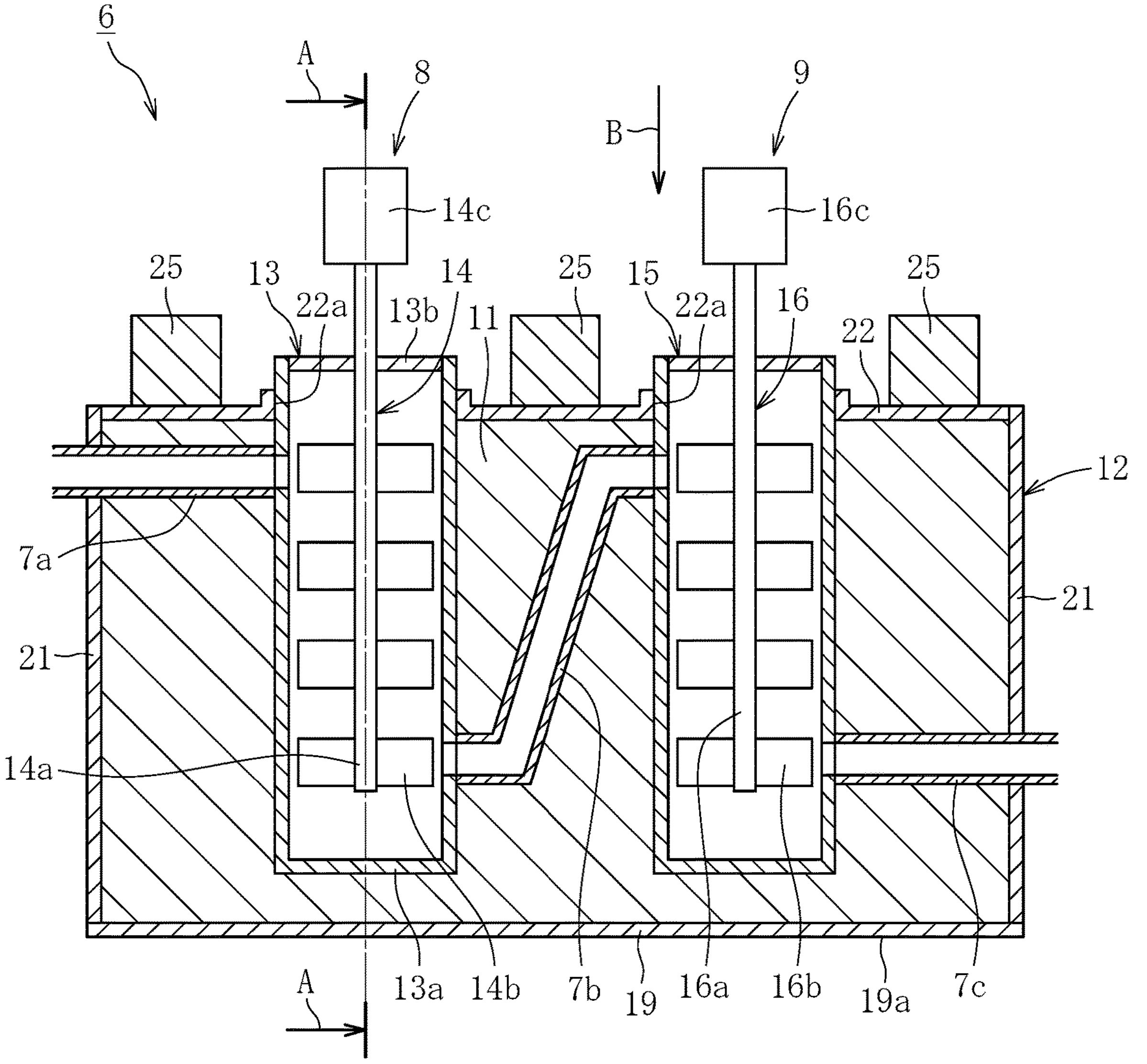
FIG. 2 is an enlarged sectional view of a treatment device illustrated in FIG. 1.
Figure 3:
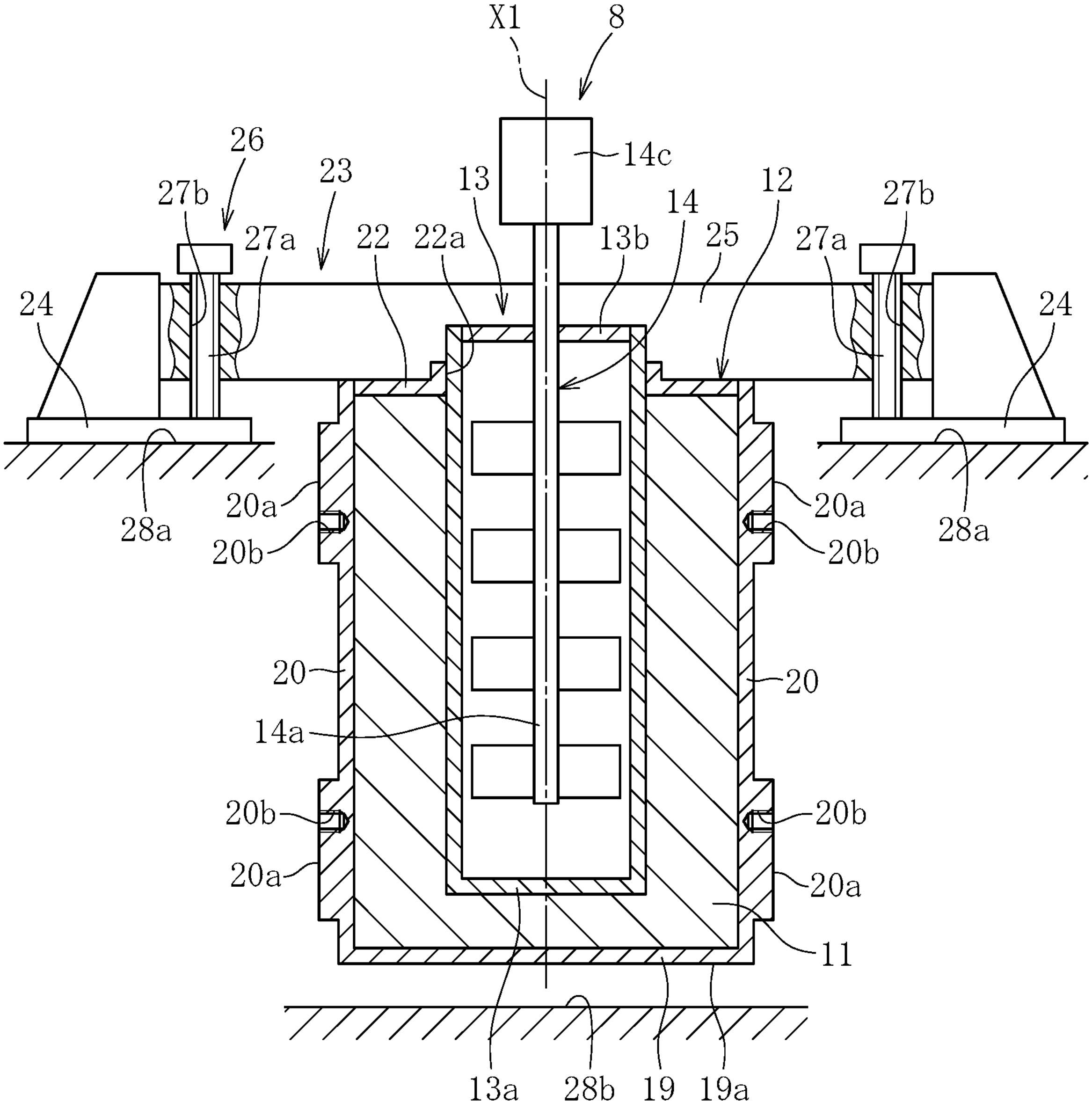
FIG. 3 is a sectional view of the treatment device illustrated in FIG. 2, which is taken along the line A-A.

FIG. 2 and FIG. 3 are sectional views, each for illustrating the homogenizer 6 according to this embodiment. As illustrated in FIG. 2 and FIG. 3, the homogenizer 6 comprises two stirring devices (first stirring device 8 and second stirring device 9), a refractory 11, and a casing 12. The refractory 11 covers the first stirring device 8 and the second stirring device 9. The casing 12 accommodates the first stirring device 8, the second stirring device 9, and the refractory 11.

Among the above-mentioned components, the first stirring device 8 comprises a first stirring tank 13, and a first stirrer 14 that is accommodated in the first stirring tank 13. The first stirring tank 13 corresponds to a treatment tank according to the present invention. A second stirring tank 15 described later also corresponds to a treatment tank according to the present invention.

The first stirring tank 13 comprises a bottomed cylindrical portion 13*a* and an upper lid portion 13*b*. The upper lid portion 13*b* closes an upper opening of the bottomed cylindrical portion 13*a*. The bottomed cylindrical portion 13*a* has an upstream end (upper side in FIG. 2) connected to the first supply pipe 7*a* and a downstream end (lower side in FIG. 2) connected to the second supply pipe 7*b*.

Further, the first stirrer 14 comprises a shaft 14*a* and a plurality of stirring blades 14*b*. The plurality of stirring blades 14*b* are mounted to the shaft 14*a* along a longitudinal direction of the shaft 14*a*. The first stirrer 14 is configured to turn the plurality of stirring blades 14*b* about the shaft 14*a* along with rotation of the shaft 14*a* so as to be able to stir the molten glass in the first stirring tank 13. In this embodiment, a first motor 14*c* functioning as a drive device is connected to an upper end of the shaft 14*a*. The shaft 14*a* rotates in a predetermined direction along with driving of the motor 14*c*. At this time, the first stirrer 14 is designed so that its center of rotation matches a center line of the first stirring tank 13, more specifically, a center line of an inner peripheral surface of the bottomed cylindrical portion 13*a*. In this case, four stirring blades 14*b* are mounted to the shaft 14*a*. However, the number of stirring blades 14*b* may be suitably increased or decreased. Further, the stirring blades 14*b* may each have any suitable shape or may have any suitable arrangement as long as the stirring blades 14*b* can cause a stirring action on the molten glass. Stirring blades 16*b* described later may also have any suitable shape, number, and arrangement.

Further, the second stirring device 9 comprises the second stirring tank 15, and a second stirrer 16 that is accommodated in the second stirring tank 15.

The second stirring tank 15 comprises a bottomed cylindrical portion 15*a* and an upper lid portion 15*b*. The upper lid portion 15*b* closes an upper opening of the bottomed cylindrical portion 15*a*. The bottomed cylindrical portion 15*a* has an upstream end (upper side in FIG. 2) connected to the second supply pipe 7*b* and a downstream end (lower side in FIG. 2) connected to the third supply pipe 7*c*.

Further, the second stirrer 16 comprises a shaft 16*a* and a plurality of stirring blades 16*b*. The plurality of stirring blades 16*b* are mounted to the shaft 16*a* along a longitudinal direction of the shaft 16*a*. The stirrer 16 is configured to turn the plurality of stirring blades 16*b* about the shaft 16*a* along with rotation of the shaft 16*a* so as to be able to stir the molten glass in the second stirring tank 15. In this embodiment, a second motor 16*c* functioning as a drive device is connected to an upper end of the shaft 16*a*. The shaft 16*a* rotates in a predetermined direction along with driving of the motor 16*c*. At this time, the second stirrer 16 is designed so that its center of rotation matches a center line of an inner peripheral surface of the bottomed cylindrical portion 15*a* of the second stirring tank 15.

The first stirring device 8 and the second stirring device 9 having the configurations described above are connected to each other in series via the second supply pipe 7*b* in a state of being accommodated in the casing 12. Thus, the molten glass, which has been supplied to the homogenizer 6 via the first supply pipe 7*a*, is stirred and mixed by the first stirring device 8 and the second stirring device 9 in the stated order from an upstream side.

The refractory 11 may be made of a suitable refractory material, for example, a publicly-known refractory material including an electroforming refractory such as a high zirconia refractory, an AZS refractory, and an alumina refractory, and a burned refractory material such as a zircon refractory, an AZS refractory, an alumina refractory, a mullite refractory, and silica refractory. The high zirconia refractory contains $ZrO2$ at 80% to 100% in percent by mass. The refractory material is not limited to those in a solid state. For example, an unshaped refractory material having flowability may be placed as part of the refractory 11. The unshaped refractory material may be arranged in a space between a shaped refractory material and the stirring devices 8 and 9 and a space between the shaped refractory material and the supply pipes 7*a*, 7*b*, and 7*c* or a space between the casing 12 and the stirring devices 8 and 9 and a space between the casing 12 and each of the supply pipes 7*a*, 7*b*, and 7*c*.

The casing 12 comprises, for example, as illustrated in FIG. 2 and FIG. 3, a bottom portion 19, two pairs of side wall portions 20 and 21, and an upper lid portion 22. Each of the bottom portion 19, the side wall portions 20 and 21, and the upper lid portion 22 has a flat plate-like shape. Thus, the casing 12 has a box-like shape as a whole.

Figure 4:
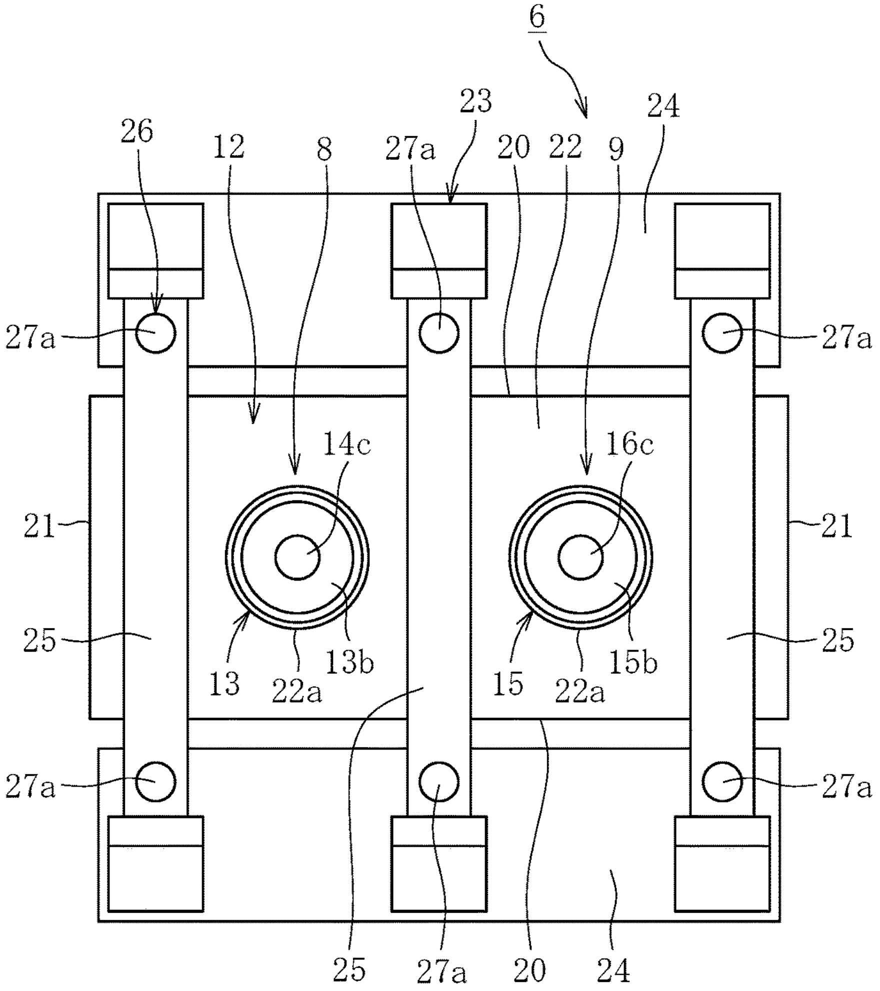
FIG. 4 is a plan view of the treatment device illustrated in FIG. 2 as viewed in the direction indicated by the arrow B.
Figure 5:
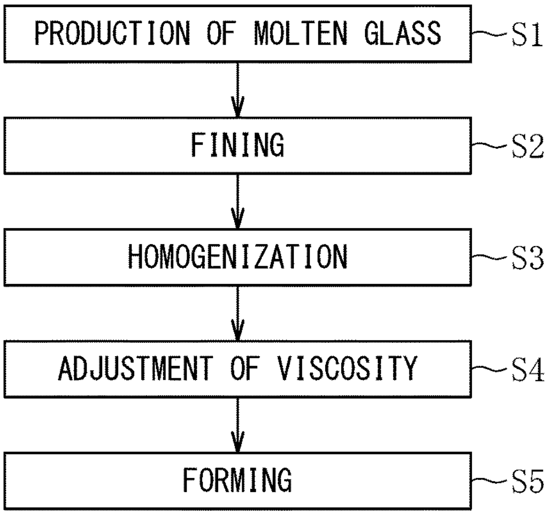
FIG. 5 is a flowchart for illustrating a flow of a method of manufacturing a glass article with use of the apparatus illustrated in FIG. 1.

Further, in this embodiment, as illustrated in FIG. 4, the casing 12 has a rectangular shape in plan view (as viewed from vertically above). In this case, the casing 12 has a cuboidal shape as a whole. Further, in this case, a direction in which the first stirring device 8 and the second stirring device 9 are arranged corresponds to a longitudinal direction of the casing 12, and a direction orthogonal to the longitudinal direction corresponds to a transverse direction of the casing 12.

Figure 7:
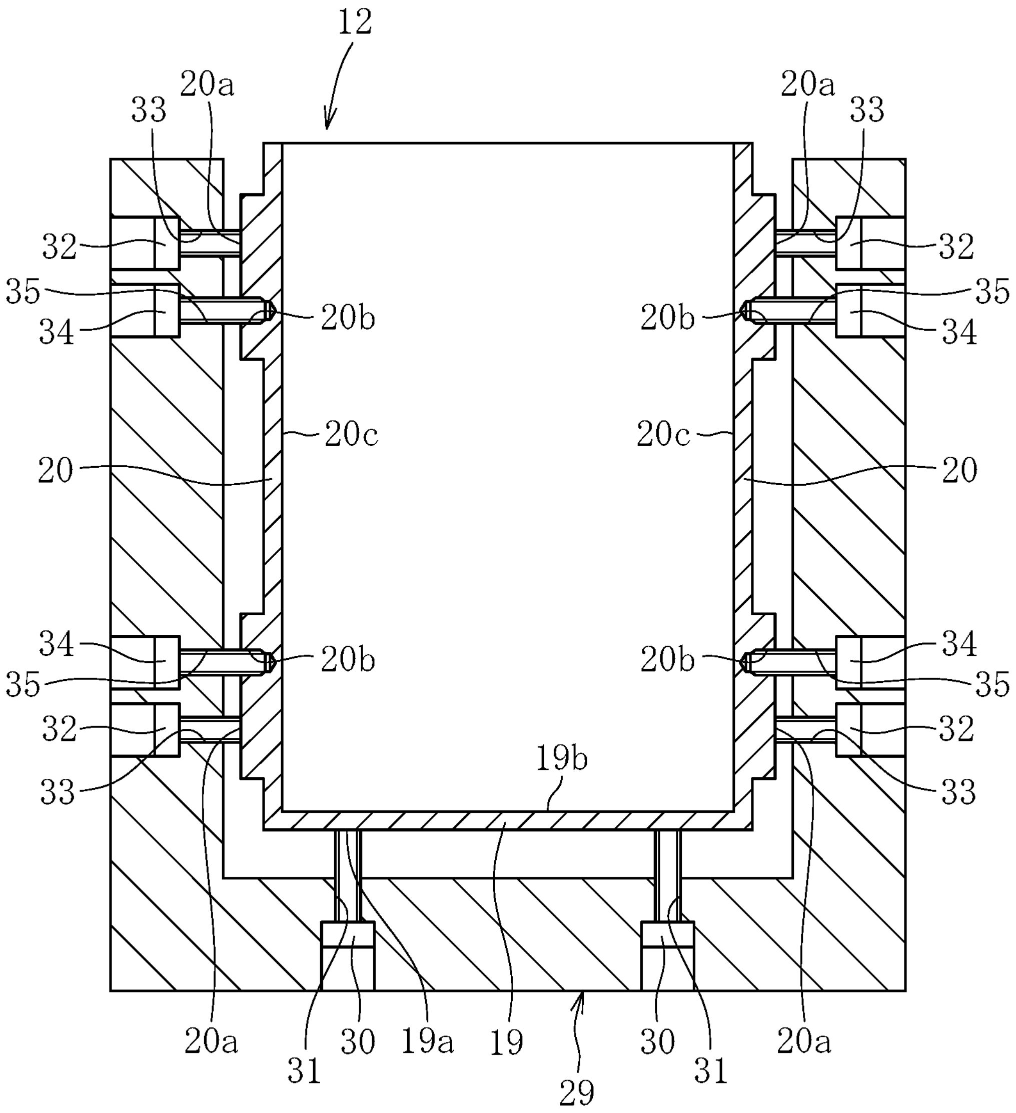
FIG. 7 is a sectional view for illustrating a perpendicularity adjustment step illustrated in FIG. 6B.
Figure 8:
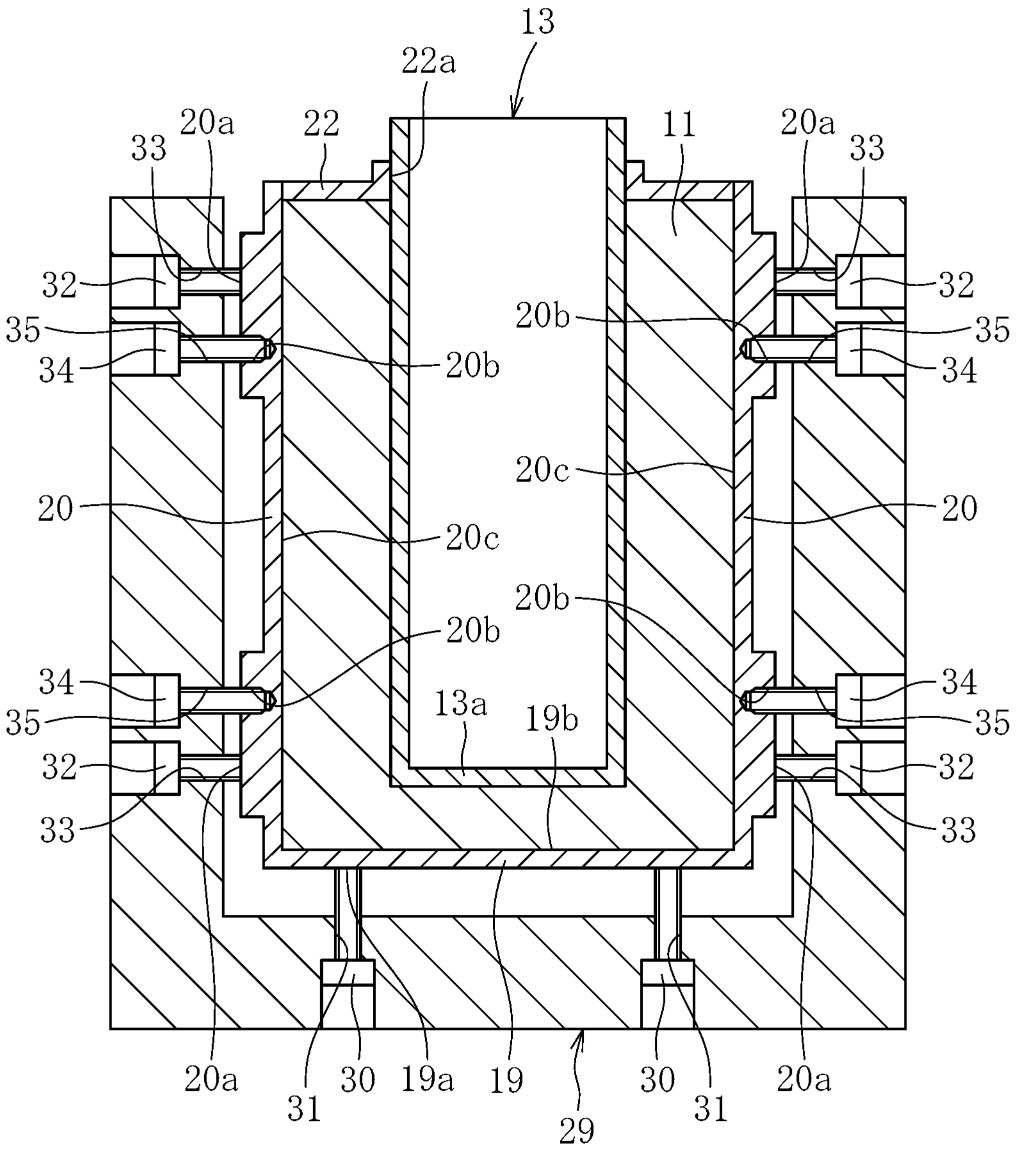
FIG. 8 is a sectional view for illustrating an assembly step illustrated in FIG. 6B.

Further, in this embodiment, as illustrated in FIG. 7, the bottom portion 19 of the casing 12 comprises a first receiving surface 19*a*. The first receiving surface 19*a* corresponds to a pressing-force receiving portion configured to receive a vertically upward pressing force. Each of one pair of side wall portions 20 extending in the longitudinal direction of the casing 12 has second receiving surfaces 20*a* corresponding to pressing-force receiving portions configured to receive a pressing force acting toward a center in the transverse direction. The pair of side wall portions 20 are hereinafter referred to as "first side wall portions 20". In this case, one pair of side wall portions 21 extending in the transverse direction of the casing 12 are hereinafter referred to as "second side wall portions 21". Further, in this embodiment, the first side wall portions 20 comprise female thread portions 20*b* corresponding to tensile-force receiving portions configured to receive a tensile force acting outward in the transverse direction (see FIG. 3 for all the portions described above). In the illustrated example, as illustrated in FIG. 3, the casing 12 comprises the second receiving surface 20*a* and the female thread portion 20*b* on each of a vertically upper side and a vertically lower side. Each of the first side wall portions 20 located on both sides in the transverse direction comprises the second receiving surfaces 20*a* and the female thread portions 20*b*.

Further, the upper lid portion 22 of the casing 12 comprises fitting holes 22*a* fittable to the stirring tanks 13 and 15, respectively. The fitting holes 22*a* allow mounting of the upper lid portion 22 after the refractory 11 and the stirring tanks 13 and 15 are accommodated in the casing 12. Although not shown, the upper lid portion 22 may have cutouts larger than the stirring tanks 13 and 15 in place of the fitting holes 22*a*. In this case, the stirring tanks 13 and 15 are fixed to the upper lid portion 22 with use of suitable fixtures.

Further, when the casing 12 has a rectangular shape in plan view (FIG. 4) as in this embodiment, it is preferred that a vertical cross section of the casing 12 illustrated in FIG. 3 have a symmetric shape with respect to a vertical line X1 passing through a center of the vertical cross section in the transverse direction. Thus, when, for example, the first side wall portions 20 located on both sides in the transverse direction of the casing 12 comprise the second receiving surfaces 20*a* and the female thread portions 20*b* as described above, it is preferred that the first side wall portions 20 comprising the second receiving surfaces 20*a* and the female thread portions 20*b* have the same sectional shape (be symmetric with respect to the vertical line X1).

The casing 12 having the above-mentioned configuration, in other words, the homogenizer 6 comprising the casing 12 having the above-mentioned configuration is supported by a suspension and support device 23 in a suspended manner. The suspension and support device 23 supports an upper part of the casing 12 to support the casing 12 in a suspended manner. In this embodiment, as illustrated in FIG. 3, the suspension and support device 23 comprises a pair of base portions 24 and beam portions 25. The pair of base portions 24 are located on both sides of the casing 12 in the transverse direction. The beam portions 25 extend in the transverse direction of the casing 12, and couple both ends of the casing 12 in the transverse direction to the base portions 24. In this case, when the beam portions 25 are fixed to the upper lid portion 22 of the casing 12, the casing 12 that is accommodating the refractory 11, the first stirring device 8, and the second stirring device 9 is supported in a suspended manner. In this embodiment, three beam portions 25 are arranged on both sides of the two stirring devices 8 and 9 in the longitudinal direction, and the casing 12 is fixed to the beam portions 25. In this manner, the casing 12 is supported in a suspended manner. As a result, the casing 12 is supported based on a floor surface 28*a* at the same height level as a level of an upper part of the casing 12 as a reference. Meanwhile, the casing 12 is separate from and vertically above a floor surface 28*b* located immediately below the casing 12 by a predetermined distance.

Further, in this embodiment, the suspension and support device 23 further comprises posture adjusting portions 26 configured to adjust a posture of the casing 12 when the casing 12 is supported in a suspended manner. Each of the posture adjusting portions 26 comprises, for example, as illustrated in FIG. 3, a male thread portion 27*a* and a female thread portion 27*b*. The female thread portions 27*b* are formed in the beam portions 25, and are threadably engageable with the male thread portions 27*a*. When the posture adjusting portions 26 move vertically downward along the male thread portions 27*a* along with the threadable engagement with the female thread portions 27*b*, distal ends (lower ends) of the male thread portions 27*a* can be brought into abutment against the base portions 24. The above-mentioned combination of the male thread portion 27*a* and the female thread portion 27*b* is provided to a coupling portion between each of the beam portions 25 and each of the base portions 24 (see FIG. 4). When each of the male thread portions 27*a* is moved in a vertical direction, a position of the casing 12 can be adjusted at each position in the longitudinal direction or in the vertical direction on one side in the transverse direction, which, in turn, enables adjustment of a posture of the casing 12 when the casing 12 is supported in a suspended manner.

Next, details of the homogenization step S3 carried out with use of the homogenizer 6 having the above-mentioned configuration are described.

Figure 6A:
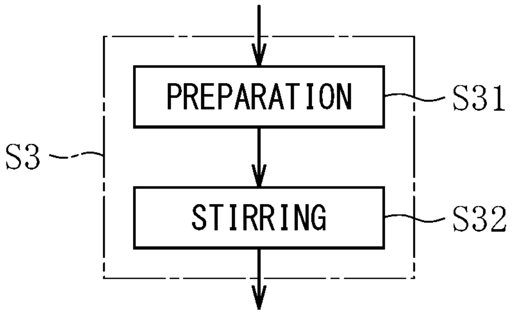
FIG. 6A is a flowchart for illustrating details of a homogenization step illustrated in FIG. 5.
Figure 6B:
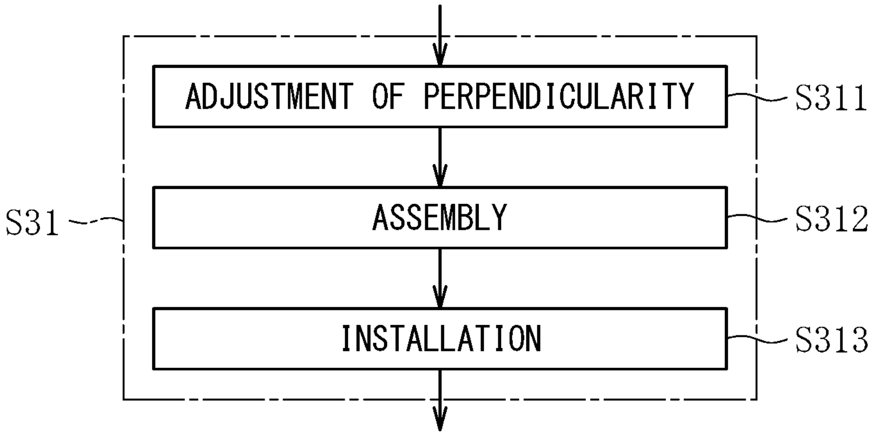
FIG. 6B is a flowchart for illustrating details of a preparation step illustrated in FIG. 6A.

As illustrated in FIG. 6A, the homogenization step S3 comprises a preparation step S31 and a stirring step S32. In the preparation step S31, the homogenizer 6 comprising the casing 12 having the configuration described above is prepared. In the stirring step S32, a stirring treatment is performed on the molten glass with use of the prepared homogenizer 6. The stirring step S32 corresponds to a treatment performing step according to the present invention. Further, as illustrated in FIG. 6B, the preparation step S31 comprises a perpendicularity adjustment step S311, an assembly step S312, and an installation step S313. In the perpendicularity adjustment step S311, the casing 12 is adjusted to have a predetermined perpendicularity before assembly. In the assembly step S312, the refractory 11, the first stirring device 8, and the second stirring device 9 are placed in the casing 12 having the adjusted perpendicularity to assemble the homogenizer 6. In the installation step S313, the assembled homogenizer 6 being supported in a suspended manner is installed at a predetermined position.

(S31) Preparation Step (S311) Perpendicularity Adjustment Step

In the perpendicularity adjustment step S311, before the homogenizer 6 comprising the casing 12 is supported in a suspended manner, a perpendicularity of an inner surface 20*c* of each of the first side wall portions 20 with respect to an upper surface 19*b* of the bottom portion 19 of the casing 12 is adjusted. In this embodiment, as illustrated in FIG. 7, the perpendicularity is adjusted with use of a fastening jig 29 configured to fasten the casing 12 on its outer side. In this embodiment, the fastening jig 29 comprises first pressing portions and second pressing portions. The first pressing portions are configured to apply a vertically upward pressing force to the bottom portion 19 of the casing 12. The second pressing portions are configured to apply a pressing force toward the center in the transverse direction to the first side wall portions 20 of the casing 12. In this embodiment, each of the first pressing portions comprises a male thread portion 30 and a female thread portion 31. The male thread portion 30 and the female thread portion 31 are provided in the fastening jig 29 so as to be opposed to a lower surface of the bottom portion 19, and are threadably engaged with each other. Further, each of the second pressing portions comprises a male thread portion 32 and a female thread portion 33. The male thread portion 32 and the female thread portion 33 are provided in the fastening jig 29 so as to be opposed to an outer surface of the first side wall portion 20 of the casing 12, and are threadably engaged with each other.

Further, in this embodiment, the fastening jig 29 further comprises tensile-force applying portions. Each of the tensile-force applying portions comprises a drawing thread portion 34 and the female thread portion 20*b*. The drawing thread portion 34 is provided to the fastening jig 29 so as to be opposed to the outer surface of the first side wall portion 20. The female thread portions 20*b* are formed in the first side wall portions 20, and are threadably engageable with the drawing thread portions 34, respectively. In this case, the drawing thread portions 34 are threadably engaged with the female thread portions 20*b* via through holes 35, each having a cylindrical shape, formed in the fastening jig 29.

The perpendicularity of the casing 12 is adjusted with use of the fastening jig 29 having the above-mentioned configuration. More specifically, as illustrated in FIG. 7, the casing 12, which has not been subjected to assembly yet, is placed at a predetermined position inside the fastening jig 29. Then, the male thread portions 30 of the first pressing portions are turned to press their distal ends against the lower surface (first receiving surface 19*a*) of the bottom portion 19. At the same time, the male thread portions 32 of the second pressing portions are turned to press their distal ends against the outer surface (second receiving surfaces 20*a*) of the first side wall portions 20. In this manner, the casing 12 is fastened. As a result, the casing 12 is placed in a state of being fastened by and held in the fastening jig 29.

The perpendicularity is adjusted under the above-mentioned state. More specifically, first, a levelness of the upper surface 19*b* of the bottom portion 19 is measured with use of a levelness measurement device. At this time, the levelness is measured by bringing the levelness measurement device closer to the upper surface 19*b* from an inside of the casing 12. Then, for example, in the case illustrated in FIG.

7, one of the two right and left male thread portions 30, which is located at a vertically lower position, is turned to push up the bottom portion 19. In this manner, the measurement of the levelness and uplift of the bottom portion 19 are repeated to thereby adjust the levelness of the upper surface 19*b* of the bottom portion 19 to have predetermined accuracy. Any suitable device may be used as the levelness measurement device. For example, various types of levelness measurement devices such as a level using a laser or a Y level may be used.

Under a state in which the levelness of the upper surface 19*b* of the bottom portion 19 has been increased to have predetermined accuracy, a perpendicularity of each of the inner surfaces 20*c* of the first side wall portions 20 with respect to the upper surface 19*b* of the bottom portion 19 is adjusted. More specifically, a perpendicularity measurement device is brought closer to the upper surface 19*b* of the bottom portion 19 and the inner surfaces 20*c* of the first side wall portions 20 from the inside of the casing 12 to measure the perpendicularity of each of the inner surfaces 20*c* with respect to the upper surface 19*b*. Then, for example, in the case illustrated in FIG. 7, one of the two upper and lower male thread portions 32, which is located on an outer side in the transverse direction, is turned in accordance with the measured perpendicularity to move the first side wall portion 20 toward the center in the transverse direction. Further, when the drawing thread portions 34 corresponding to the tensile-force applying portions are provided as in this embodiment, the drawing thread portions 34 are turned to allow the first side wall portions 20 to move outward in the transverse direction. In this manner, the perpendicularity of each of the inner surfaces 20*c* of the first side wall portions 20 with respect to the upper surface 19*b* of the bottom portion 19 is adjusted to have predetermined accuracy by repeating the measurement of the perpendicularity and the inward or outward movement of the first side wall portions 20.

A target perpendicularity at this time is, for example, 0.001 or less. When a height dimension (vertical dimension) of each of the first side wall portions 20 is 1,000 mm, the inner surface 20*c* of each of the first side wall portions 20 is located between two ideal planes that are parallel and apart from each other by 1.0 mm. The perpendicularity is preferably 0.0005 or smaller. When the height dimension of each of the first side wall portions 20 is 1,000 mm, the inner surface 20*c* of each of the first side wall portions 20 is located between two ideal planes that are apart from each other by 0.5 mm. A suitable device may be used as the perpendicularity measurement device. For example, a non-contact-type perpendicularity measurement device using a laser or a contact-type perpendicularity measurement device using a contactor may be used.

(S312) Assembly Step

After the perpendicularity of the casing 12 is adjusted as described above, the homogenizer 6 comprising the casing 12 is assembled. More specifically, first, the refractory 11 is laid on the upper surface 19*b* of the bottom portion 19. Then, the first stirring tank 13 and the second stirring tank 15 are arranged at predetermined positions in the longitudinal direction. The stirring tanks 13 and 15 are vertically positioned by using outer peripheral surfaces of the stirring tanks 13 and 15 as references. At this time, a perpendicularity of each of the outer peripheral surfaces with respect to the upper surface 19*b* of the bottom portion 19 may be adjusted, or a parallelism of each of the outer peripheral surfaces with respect to the inner surface 20*c* of the first side wall portion 20 may be adjusted. After that, a space around the stirring tanks 13 and 15 is filled with the refractory 11, and the upper lid portion 22 of the casing 12 is mounted. As a result, the first side wall portions 20 that are located on both sides of the casing 12 in the transverse direction are coupled to each other with the upper lid portion 22. At the same time, upper parts of the stirring tanks 13 and 15 are fitted into the fitting holes 22*a* of the upper lid portion 22. In this manner, the stirring tanks 13 and 15 are fixed to the casing 12. The assembly of most part of the homogenizer 6 is completed in the above-mentioned manner (see FIG. 8).

(S313) Installation Step

After the upper lid portion 22 is mounted as described above, the fastening of the casing 12 with the fastening jig 29 is released to demount the fastening jig 29 from the casing 12. After that, the homogenizer 6 is moved to a predetermined position (installation position) in the apparatus 1 for manufacturing a glass article, and is mounted to the suspension and support device 23. More specifically, the homogenizer 6 is installed under a state in which the casing 12 is supported in a suspended manner by fixing the upper lid portion 22 of the casing 12 to the beam portions 25 of the suspension and support device 23. Finally, the first stirrer 14 and the second stirrer 16, to which the upper lid portions 13*b* and 15*b* of the stirring tanks 13 and 15 have been mounted, respectively, are inserted into corresponding stirring tanks 13 and 15 to fix the motors 14*c* and 16*c* in predetermined positions. As a result, the installation of the homogenizer 6 is completed (state illustrated in FIG. 3).

As described above, with the apparatus 1 for manufacturing a glass article or the method of manufacturing a glass article according to the present invention, the casing 12 configured to hold the stirring tanks 13 and 15 is supported in a suspended manner. When the casing 12 is supported as described above, a force for restoring an original shape of the casing 12 (shape of the casing 12 given before assembly) acts on the casing 12 under its own weight. Thus, even if the casing 12 is deformed at a time when the homogenizer 6 is installed or in use, the force for restoring the shape of the casing 12 given before the casing 12 is deformed acts on the casing 12, allowing the shape of the casing 12 to return to or become closer to the shape given before the deformation. Further, when the casing 12 has the same shape as that of the casing 12 given before assembly at the beginning of the support in a suspended manner, the shape is maintained under the own weight. As described above, according to the apparatus 1 for manufacturing a glass article or the method of manufacturing a glass article according to the present invention, inclination of the stirring tanks 13 and 15, which may be caused when the homogenizer 6 is installed or in use, is prevented as much as possible, thereby enabling prevention of a decrease in stirring efficiency (homogenization efficiency) or stirring capability (homogenization capability), which may be caused due to the inclination. In other words, a satisfactory homogenization treatment on the molten glass can be stably performed.

Further, in this embodiment, the casing 12 has a rectangular shape in plan view (see FIG. 4). Besides, the vertical cross section of the casing 12 has a symmetric shape with respect to the vertical line X1 passing through the center of the vertical cross section in the transverse direction (see FIG. 3). Further, the perpendicularity of each of the inner surfaces 20*c* of the first side wall portions 20 with respect to the upper surface 19*b* of the bottom portion 19 of the casing 12 is set to 0.001 or less. When the shape of the casing 12 is set as described above, a center of gravity of the casing 12 can be set on the vertical line passing through the center in the transverse direction of the casing 12 in design. Thus, when the casing 12 has a designed shape at the beginning of the installation (support in a suspended manner), this state is maintained even when the homogenizer 6 is in use. Alternatively, when a center line of the casing 12, which passes through the center of the vertical cross section of the casing 12 in the transverse direction, is inclined with respect to the vertical line X1 at the time of installation, the own weight acts on the casing 12 in such a direction as to match the center line with the vertical line X1. Thus, the casing 12 constantly maintains the designed shape regardless of the state at the time of installation, in other words, a sufficient shape restoring effect or shape maintaining effect achieved by the support in a suspended manner is enjoyed, enabling reliable prevention of the inclination of each of the stirring tanks 13 and 15.

Further, in this embodiment, before the casing 12 is supported in a suspended manner, the perpendicularity of each of the inner surfaces 20*c* of the first side wall portions 20 with respect to the upper surface 19*b* of the bottom portion 19 of the casing 12 is adjusted. Thus, the perpendicularity of the casing 12 can be adjusted before the casing 12 is subjected to the assembly. Without the stirring tanks 13 and 15 or the refractory 11, the perpendicularity can be measured inside the casing 12 under a state in which the outer side of the casing 12 is held (fastened) by the predetermined fastening jig 29, as illustrated in FIG. 7. Thus, the measurement of the perpendicularity and correction of the casing 12 can easily be carried out repeatedly. Thus, the perpendicularity can extremely easily be adjusted. Further, when not only the pressing portions (male thread portions 32 and female thread portions 33) but also the tensile-force applying portions (drawing thread portions 34 and female thread portions 20*b*) are provided as in this embodiment, the first side wall portions 20 can be moved not only toward the center in the transverse direction but also outward in the transverse direction. Thus, when, for example, anon-negligible warp occurs in the first side wall portions 20, the perpendicularity with respect to the upper surface 19*b* of the bottom portion 19 can be adjusted with high accuracy while the warp is eliminated to ensure a flatness.

When the casing 12 has a rectangular shape in plan view as in this embodiment, deformation of the casing 12 in the longitudinal direction can be prevented. Thus, it is only required to adjust the perpendicularity of each of the first side wall portions 20 located on both sides in the transverse direction with respect to the bottom portion 19, contributing to a reduction in the number of steps.

The one embodiment of the present invention has been described above. However, the apparatus for manufacturing a glass article and the method of manufacturing a glass article according to the present invention are not limited to the above-mentioned embodiment, and various modes may be adopted within the scope of the present invention.

For example, regarding a mode in which the casing 12 is supported in a suspended manner, the casing 12 is supported in a suspended manner by fixing the upper lid portion 22 of the casing 12 to the beam portions 25 of the suspension and support device 23 in the embodiment. However, as a matter of course, the mode in which the casing 12 is supported in a suspended manner is not limited to the above-mentioned mode. For example, although not shown, the casing 12 may be supported in a suspended manner by fixing upper ends of the first side wall portions 20 or the second side wall portions 21 to the beam portions 25 through coupling members. Alternatively, the casing 12 may be supported in a suspended manner by fixing the stirring tanks 13 and 15 and the casing 12 to each other and upper ends of the stirring tanks 13 and 15 to the beam portions 25. In short, the casing 12 may be supported in a suspended manner by fixing any suitable member fixable to the casing 12 to the beam portions 25.

Further, in this embodiment, it has been exemplified a case in which the casing 12 is supported in a suspended manner by fixing the beam portions 25 to the casing 12. However, as a matter of course, the configuration of the suspension and support device 23 is not limited thereto. The suspension and support device 23 may have any suitable configuration as long as the suspension and support device 23 is formed so as to be able to couple the base portions 24 fixed onto the floor surface 28*a* and the casing 12 (or components of the homogenizer 6 fixed to the casing 12) to each other.

Further, regarding the perpendicularity adjustment step S311, the first and second pressing portions comprising the male thread portions 30 and 32 and the female thread portions 31 and 33 have been exemplified as the first and second pressing portions provided to the fastening jig 29. However, the pressing portions are not limited to those described above. Each of the pressing portions may have any suitable configuration as long as the pressing portion can inwardly press the first side wall portion 20 toward the center in the transverse direction or vertically upwardly press the bottom portion 19. Further, each of the tensile-force applying portions is not limited to the illustrated mode (drawing thread portion 34 and female thread portion 20*b*), and may have any suitable configuration. As a matter of course, the positions and the number of the pressing portions or those of the tensile-force applying portions may be suitably set, and are not limited to those in the illustrated mode.

Still further, the application of the present invention to the homogenization step S3 for achieving homogenization by stirring the molten glass and the casing 12 of the homogenizer 6 used in this step S3 has been described. However, as a matter of course, the present invention is also applicable to equipment relating to the steps other than the homogenization step S3. For example, although not shown, the present invention may be applied to a flow rate adjustment step and a flow rate adjustment tank used in this step. In the flow rate adjustment step, a flow rate of the molten glass is adjusted by raising and lowering a needle inside a treatment tank to change a sectional area of an outflow port formed in a lower end. Further, the application of the present invention is not limited to the treatment steps exemplified above. The present invention may be applied to all treatment steps to be carried out with use of a treatment device comprising an operating member, which is provided inside a treatment tank and operates for the treatment tank.

Still further, the application of the present invention to the apparatus for and the method of manufacturing a glass sheet as a glass article has been exemplified. However, as a matter of course, the present invention may be applied to an apparatus or a method of manufacturing a glass article other than a glass sheet, for example, other kinds of glass articles such as a tube glass or glass fiber.

REFERENCE SIGNS LIST

1 apparatus for manufacturing glass article
2 glass melting furnace
3 fining device
4 viscosity adjusting device
5 forming device
6 homogenizer

7*a*, 7*b*, 7*c* supply pipe
8, 9 stirring device
11 refractory
12 casing
13, 15 stirring tank
13*a*, 15*a* bottomed cylindrical portion
13*b*, 15*b* upper lid portion
14, 16 stirrer
14*a*, 16*a* shaft
14*b*, 16*b* stirring blade
14*c*, 16*c* motor
19 bottom portion
20, 21 side wall portion
22 upper lid portion
23 suspension and support device
24 base portion
25 beam portion
26 posture adjusting portion
28*a*, 28*b* floor surface
29 fastening jig
30, 32 male thread portion
31, 33 female thread portion
34 drawing thread portion
35 through hole
S1 molten glass producing step
S2 fining step
S3 homogenization step
S31 preparation step
S311 perpendicularity adjustment step
S312 assembly step
S313 installation step
S32 stirring step
S4 viscosity adjustment step
S5 forming step
X1 vertical line

The invention claimed is:

1. An apparatus for manufacturing a glass article, the apparatus comprising:
- a glass melting furnace configured to produce molten glass;
- a treatment device configured to perform a predetermined treatment on the produced molten glass; and
- a forming device configured to form the molten glass into a predetermined shape that has been subjected to the predetermined treatment,
- wherein the treatment device comprises:
  - a treatment tank that extends vertically, the treatment tank to be supplied with the molten glass;
  - a casing configured to hold the treatment tank; and
  - a suspension and support device configured to support the casing in a suspended manner while the treatment device performs the predetermined treatment,
- wherein the treatment tank comprises a plurality of stirring tanks,
- wherein a stirrer is accommodated in each of the stirring tanks, and
- wherein the molten glass supplied to each of the stirring tanks is stirred through rotation of the stirrer.

2. The apparatus for manufacturing a glass article according to claim 1,
- wherein the casing has a rectangular shape in plan view, and
- wherein the casing has a vertical cross section with a shape symmetric with respect to a vertical line passing through a center, in a transverse direction, of the vertical cross section.

3. The apparatus for manufacturing a glass article according to claim 1,
- wherein the casing comprises a bottom portion and a pair of side wall portions being upright with respect to the bottom portion, and
- wherein an inner surface of each of the side wall portions has a perpendicularity equal to or smaller than 0.001 with respect to an upper surface of the bottom portion.

4. The apparatus for manufacturing a glass article according to claim 2,
- wherein the casing comprises a bottom portion and a pair of side wall portions being upright with respect to the bottom portion, and
- wherein an inner surface of each of the side wall portions has a perpendicularity equal to or smaller than 0.001 with respect to an upper surface of the bottom portion.

* * * * *